United States Patent
Yoshinari et al.

(10) Patent No.: US 7,628,067 B2
(45) Date of Patent: Dec. 8, 2009

(54) ELECTRODE ROD FOR DETECTING WATER-LEVEL, METHOD OF DETECTING WATER-LEVEL, METHOD OF CONTROLLING WATER-LEVEL IN A BOILER, AND METHOD OF CONTROLLING WATER-LEVEL IN A STEAM SEPARATOR

(75) Inventors: Yuji Yoshinari, Matsuyama (JP); Hideo Furukawa, Matsuyama (JP); Osamu Tanaka, Matsuyama (JP)

(73) Assignee: Miura Col, Ltd, Ehime-ken (JP)

( * ) Notice: Subject to any disclaimer, the term of this patent is extended or adjusted under 35 U.S.C. 154(b) by 24 days.

(21) Appl. No.: 11/706,980

(22) Filed: Feb. 16, 2007

(65) Prior Publication Data
US 2007/0221355 A1 Sep. 27, 2007

(30) Foreign Application Priority Data

| Mar. 8, 2006 | (JP) | 2006-062458 |
| Apr. 7, 2006 | (JP) | 2006-106072 |
| Jul. 10, 2006 | (JP) | 2006-189204 |
| Sep. 29, 2006 | (JP) | 2006-267841 |

(51) Int. Cl.
*G01F 23/26* (2006.01)
(52) U.S. Cl. .......... 73/304 C; 73/290 R; 73/304 R
(58) Field of Classification Search ........ 73/304 C, 73/290 B, 290 R, 290 V, 291, 304 R
See application file for complete search history.

(56) References Cited

U.S. PATENT DOCUMENTS

| 4,590,575 A | * | 5/1986 | Emplit | 702/52 |
| 5,049,878 A | * | 9/1991 | Stern | 340/870.4 |
| 5,245,873 A | * | 9/1993 | Fathauer et al. | 73/304 C |
| 5,845,660 A | * | 12/1998 | Shindo et al. | 134/56 R |
| 6,101,873 A | * | 8/2000 | Kawakatsu et al. | 73/304 C |
| 6,776,900 B2 | * | 8/2004 | Mazurek et al. | 210/115 |
| 2005/0048218 A1 | * | 3/2005 | Weidman | 427/446 |

FOREIGN PATENT DOCUMENTS

| JP | 4-148102 A | 5/1992 |
| JP | 6-147407 A | 5/1994 |
| JP | 7-318395 A | 12/1995 |
| JP | 2000-55712 A | 2/2000 |
| JP | 2003-294204 A | 10/2003 |

* cited by examiner

*Primary Examiner*—David A. Rogers
(74) *Attorney, Agent, or Firm*—Birch, Stewart, Kolasch & Birch, LLP

(57) ABSTRACT

An insulating coating formed of engineering plastic with high-heat resistance, high-pressure resistance, and chemical resistance is formed on a surface of a water-level detecting electrode part of an electrode rod for detecting water-level attached to penetrate a metal container communicating with a boiler and including an external power supply connecting terminal part projecting outside the container and the water-level detecting electrode part projecting inside the container. One side of a power supply is connected to the external power supply connecting terminal part, and another side of the power supply is connected to the container for energization. An electrostatic capacity between the water-level detecting electrode and the container is measured by using the insulating coating on the surface of the water-level detecting electrode part as a dielectric. The water-level of water in contact with the water-level detecting electrode part in the container can be detected from the electrostatic capacity.

12 Claims, 3 Drawing Sheets

ELECTRODE ROD FOR DETECTING WATER-LEVEL, METHOD OF DETECTING WATER-LEVEL, METHOD OF CONTROLLING WATER-LEVEL IN A BOILER, AND METHOD OF CONTROLLING WATER-LEVEL IN A STEAM SEPARATOR

BACKGROUND OF THE INVENTION

1. Field of the Invention

The present invention relates to an electrode rod for detecting water-level attached to a metal container and used for detecting water-level in the container, to a method of detecting water-level employing the electrode rod for detecting water-level, to a method of controlling water-level in a boiler, and to a method of controlling water-level in a steam separator.

2. Description of the Related Art

A vapor to be generated in a boiler is mixed with water in a state where bubbles generated in a water tube of the boiler exceed an upper header under heating, and the vapor to be obtained becomes a bad quality wet vapor with much moisture. In the case where the bubbles generated in the water tube do not reach the upper header, water is not mixed with the generated vapor, and the vapor to be obtained becomes a good quality dry vapor. However, the case where a position of the bubbles generated in the water tube is low and a water film of bubbles cannot be formed in the upper header leads to a situation where the upper header is overheated by flame, melted, and damaged because the water tube is produced from iron. Thus, water-level in the water tube must be controlled to water-level such that the bubbles generated in the water tube do not exceed the upper header under heating and the water film is formed in the upper header.

The water-level in the water tube is determined by size of the bubbles to be generated under heating. That is, in the case where the bubbles to be generated are large, the water-level is lowered, and in the case where the bubbles to be generated are small, the water-level is raised. The size of the bubbles to be generated varies depending on burning capacity, vapor pressure, supply water temperature, electrical conductivity of boiler water, and the like during operation of the boiler.

Thus, in the boiler, the water-level in the water tube is controlled by: setting optimum water-level in accordance with the burning capacity, vapor pressure, supply water temperature, electrical conductivity of boiler water, and the like; detecting the water-level in the water tube with an electrode rod for detecting water-level; and supplying water or stopping water supply to the water tube so as to adjust the water-level to water-level in accordance with the burning capacity, vapor pressure, supply water temperature, electrical conductivity of boiler water, and the like during operation of the boiler.

In a conventional boiler, detection of the water-level in the water tube with the electrode rod for detecting water-level is carried out as described below.

The electrode rod for detecting water-level is provided with an external power supply connecting terminal part to be connected to a power supply, and a water-level detecting electrode part to be brought into contact with water, and is attached to a metal container for detecting water-level communicating with a water tube of a boiler through an insulator. The container communicating with the water tube of the boiler holds water common with that of the water tube of the boiler, and the held water has water-level common with the water-level in the water tube. One side of the power supply is connected to the external power supply connecting terminal part of the electrode rod for detecting water-level, and another side of the power supply is connected to the container for energization. Whether the water-level has reached the water-level detecting electrode part can be detected by change in conduction state between the external power supply connecting terminal part and the container.

The container is provided with a plurality of electrode rods for detecting water-level of different lengths corresponding to water-level set based on the burning capacity, vapor pressure, supply water temperature, and electrical conductivity of boiler water. The water-level in the container detected by each electrode rod for detecting water-level is sent to a water-level controlling device. Water supply is controlled so that there is provided water-level set in accordance with the burning capacity, vapor pressure, supply water temperature, electrical conductivity of boiler water, and the like during operation of the boiler, and the water-level in the water tube is controlled to predetermined water-level (see JP 06-147407 A, for example).

Meanwhile, in the boiler, a vapor generated under heating of the water tube is taken out from the upper header to be sent a loading side, but the vapor taken out from the upper header contains boiler water, and the vapor containing the boiler water is a bad quality wet vapor with much moisture.

Thus, the boiler is generally provided with a steam separator for separating moisture from the vapor taken out from the upper header. The case where water-level in the steam separator is too high involves situations in that the generated vapor easily contains boiler water and dryness of the vapor reduces. In contrast, in the case where the water-level in the steam separator is too low, an ability of the steam separator is sufficiently exerted and a good quality dry vapor is obtained. However, the water-level in the water tube may be low. The case where the water-level in the water tube is low involves situations in that the position of the bubbles generated in the water tube is low and a water film of bubbles cannot be formed in the upper header. Thus, this case may involve a situation in that an upper part of the water tube and the upper header are overheated by flame, melted, and damaged because the water tube is produced from iron.

For avoiding such situations, the water-level in the steam separator is controlled to a certain level for controlling the water-level in the water tube such that increase in an amount of boiler water to be mixed with the generated vapor is restricted and the water film is formed in the upper header.

As means of controlling the water-level in the steam separator to a certain level, there is known a control method involving detecting water-level in a steam separator with an electrode rod for detecting water-level and turning on and off a water supply pump for supplying boiler water to a water tube in accordance with the detected water-level. The method of controlling water-level in a steam separator involves: setting upper limit water-level and lower limit water-level for the water-level in the steam separator; and turning off the water supply pump when the upper limit water-level is detected and turning on the water supply pump when the lower limit water-level is detected for constantly maintaining the water-level in the steam separator between the upper limit water-level and the lower limit water-level (see JP 2003-294204 A, for example).

The electrode rod for detecting water-level to be used for detecting the water-level in a conventional steam separator has the same structure as the electrode rod for detecting water-level to be used for detecting the water-level in the water tube of the boiler. Detection of the water-level is carried out as described below.

The electrode rod for detecting water-level is attached to a metal container for detecting water-level in a steam separator communicating with the steam separator through an insulator. The container holds water common with that of the water tube of the steam separator, and the held water has water-level common with the water-level in the steam separator. One side of the power supply is connected to the external power supply connecting terminal part of the electrode rod for detecting water-level, and another side of the power supply is connected to the container for energization. Whether the water-level has reached the water-level detecting electrode part can be detected by change in conduction state between the external power supply connecting terminal part and the container.

SUMMARY OF THE INVENTION

Water-level in a water tube of a boiler is controlled in accordance with burning capacity, vapor pressure, supply water temperature, electrical conductivity of boiler water, and the like during operation of the boiler. However, for obtaining a good quality vapor and for preventing damages to the water tube, the water-level is preferably controlled by setting finely the water-level in accordance with the burning capacity, vapor pressure, supply water temperature, electrical conductivity of boiler water, and the like.

However, the water-level in the water tube is conventionally detected by a plurality of electrode rods for detecting water-level with different lengths as described above, and one electrode rod for detecting water-level can detect one water-level. Thus, in the case where the water-level is to be finely controlled in accordance with the burning capacity, vapor pressure, supply water temperature, electrical conductivity of boiler water, and the like, the number of electrode rods for detecting water-level to be attached to the container increases. Further, this case involves problems in that a device enlarges and cost increases.

Thus, three to four water-levels are conventionally set, and the water-level in the water tube is controlled within the set water-levels. JP 06-147407 A describes that four water-levels combining the burning capacity and vapor pressure, and the burning capacity and electrical conductivity of boiler water, and the water-level in the water tube is controlled within the four water-levels. However, control of the water-level within the three to four water-levels hardly provides water-level in the water tube for providing a good quality vapor and preventing damages to the water tube.

As a method of solving the problems described above, an insulating coating serving as a dielectric is formed on a surface of a water-level detecting electrode part of an electrode rod for detecting water-level, and a part in which water is brought into contact with the water-level detecting electrode part in the container serves as a condenser. An electrostatic capacity between the water-level detecting electrode part and the container due to change in water to be brought into contact with the water-level detecting electrode part is measured through energization, and analog detection of the water-level in the water to be brought into contact with the water-level detecting electrode part in the container can be realized from the measured electrostatic capacity. In this way, fine control of the water-level in the water tube can presumably be realized.

However, inside of the water tube of the boiler is in a high-temperature, high-pressure, and high-pH environment, and no electrode rod for detecting water-level formed of an insulating material with standing the high-pressure, high-pressure, and high-pH and having an insulating coating serving as a dielectric formed on a surface of a water-level detecting electrode part exists.

For control of water-level in a steam separator, the water-level in the steam separator is controlled so as to be constantly maintained between specific upper limit water-level and lower limit water-level as described above. However, this method cannot necessarily provide stably a good quality vapor with high dryness, and cannot necessarily prevent situations in that an upper part of a water tube and an upper header are damaged by flame.

This is because in the case where a vapor speed is high, water accumulated in the steam separator is mixed with the vapor and provides a vapor containing moisture, that is, a vapor with low dryness. Thus, in the case where the water-level in the steam separator is adjusted to a state of high vapor speed, for example, the upper limit water-level in the steam separator is set low. As a result, the case where the vapor speed reduces may cause a situation in that the upper part of the water tube and the upper header may be damaged by flame even if the water-level in the steam separator is at the upper limit water-level. Further, in the case where the water-level in the steam separator is adjusted to a state of low vapor speed, the upper limit water-level in the steam separator is set high. As a result, the case where the vapor speed increases may cause a situation in that the water accumulated in the steam separator is mixed with the vapor and provides a vapor containing moisture, that is, a vapor with low dryness even if the water-level in the steam separator is at the upper limit water-level.

The inventors of the present invention have found that the problems described above can be solved by controlling the water-level in the steam separator with the speed of the vapor to be generated in the boiler. The control requires fine detection of the water-level in the steam separator, and thus analog detection of the water-level in the steam separator is desired. As means for analog detection of the water-level in the steam separator, similar to the detection of the water-level in the water tube of the boiler, a part in which water is brought into contact with the water-level detecting electrode part of the electrode rod for detecting water-level in the container communicating with the steam separator serves as a condenser. An electrostatic capacity between the water-level detecting electrode part and the container due to change in water to be brought into contact with the water-level detecting electrode part is measured through energization, and analog detection of the water-level can be realized. Further, inside of the steam separator is in a high-temperature, high-pressure, and high-pH environment.

Thus, the inventors of the present invention have found an insulating material having high high-temperature resistance, high-pressure resistance, and high-pH resistance (chemical resistance) as a result of researches, and completed the present invention.

It is an object of the present invention to provide an electrode rod for detecting water-level allowing analog detection of water-level of water held in a metal tank.

It is another object of the present invention to provide a method of detecting water-level for analog detection of water-level of water held in a metal tank by using the electrode rod for detecting water-level.

It is still another object of the present invention to provide a method of controlling water-level in a boiler for controlling water-level in a water tube to optimum water-level providing a good quality vapor and preventing damages to the water tube by using the method of detecting water-level.

It is yet another object of the present invention to provide a method of controlling water-level in a steam separator for controlling water-level in a steam separator by a speed of a vapor to be generated in a boiler, separating moisture from the vapor generated in the boiler, stably obtaining a good quality vapor with high dryness, and conducting a safe operation of the boiler by using the method of detecting water-level.

In order to achieve the above-mentioned object, according to a first aspect of the present invention, there is provided an electrode rod for detecting water-level, attached to penetrate a metal container through an insulator, for detecting water-level in the container including an external power supply connecting terminal part projecting outside the container, and a water-level detecting electrode part projecting inside the container, the electrode rod being characterized by including an insulating coating formed of engineering plastic with high heat resistance, high-pressure resistance, and chemical resistance and formed on a surface of the water-level detecting electrode part.

According to a second aspect of the present invention, in the first aspect of the invention, an electrode rod for detecting water level is characterized in that the engineering plastic includes one of polyether ether ketone and a fluorine resin.

According to a third aspect of the present invention, there is provided a method of detecting water-level employing the electrode rod for detecting water-level according to the first or second aspect, characterized by including: connecting one side of a power supply to the external power supply connecting terminal part and connecting another side of the power supply to the metal container for energization; measuring an electrostatic capacity between the water-level detecting electrode part and the container by using as a dielectric the insulating coating formed on the surface of the water-level detecting electrode part; and detecting water-level of water to be brought into contact with the water-level detecting electrode part in the container from the electrostatic capacity.

According to a fourth aspect of the present invention, in the third aspect of the invention, a method of detecting water-level is characterized by including: providing to the container an adjusting electrode rod for detecting water-level for detecting specific water-level within a range of the water-level detecting electrode part; determining a difference between the specific water-level detected by the adjusting electrode rod for detecting water-level and water-level detected by measuring the electrostatic capacity; and adjusting the water-level to be detected by measuring the electrostatic capacity based on the difference.

According to a fifth aspect of the present invention, there is provided a method of controlling water-level in a boiler employing the method of detecting water-level according to the third or fourth aspect, characterized by including: setting proportional target water-level in a boiler from at least one of burning capacity, vapor pressure, supply water temperature, and electrical conductivity of boiler water; detecting at least one of the burning capacity, vapor pressure, supply water temperature, and electrical conductivity of boiler water during operation of the boiler; calculating constantly a difference between the proportional target water-level specified by detected values, and actual water-level in the boiler detected by the method of detecting water-level; and controlling a supply water amount by stopping water supply when the actual water-level exceeds the specified proportional target water-level, and by supplying water until the actual water-level reaches the proportional target water-level when the actual water-level falls short of the specified proportional target water-level.

According to a sixth aspect of the present invention, there is provided a method of controlling water-level in a steam separator employing the method of detecting water-level according to the third or fourth aspect, characterized by including: setting proportional target water-level in a steam separator from at least one of supply water temperature, burning capacity, and vapor pressure; detecting at least one of the supply water temperature, burning capacity, and vapor pressure during operation of the boiler; specifying the proportional target water-level by detected values; detecting actual water-level in the steam separator by the method of detecting water-level; calculating constantly a difference between the specified proportional target water-level, and the actual water-level; and controlling a supply water amount by stopping water supply to the boiler when the actual water-level exceeds the specified proportional target water-level, and by supplying water to the boiler until the actual water-level reaches the proportional target water-level when the actual water-level falls short of the specified proportional target water-level.

In the electrode rod for detecting water level according to the first aspect of the invention, the insulating coating formed of engineering plastic with high heat resistance, high-pressure resistance, and chemical resistance is formed on a surface of the water-level detecting electrode part projecting inside the metal container. Thus, the insulating coating formed on the surface of the water-level detecting electrode part is capable of withstanding high-temperature, high-pressure, and chemicals in the container, and a part in which water is brought into contact with the water-level detecting electrode part in the container serves as a condenser. The electrostatic capacity between the water-level detecting electrode part with which water is brought into contact and the container is measured through energization, and the water-level in the water to be brought into contact with the water-level detecting electrode part in the container can be detected. Thus, analog detection of change in water-level is realized by change in measured electrostatic capacity.

In the electrode rod for detecting water level according to the second aspect of the invention, the engineering plastic according to the first aspect is polyether ether ketone. Thus, the insulating coating formed on the surface of the water-level detecting electrode part is capable of withstanding high-temperature, high-pressure, and chemicals in the metal container, and may assuredly carry out functions as a condenser.

In the method of detecting water level according to the third aspect of the invention, a part in which water is brought into contact with the water-level detecting electrode part in the container serves as a condenser. The electrostatic capacity between the water-level detecting electrode part with which the water is brought into contact and the container is measured through energization, and the water-level in the water to be brought into contact with the water-level detecting electrode part in the container can be detected. Thus, analog detection of change in water-level is realized by change in measured electrostatic capacity.

In the method of detecting water-level according to the fourth aspect of the invention, even if contamination or the like mixed in water is attached to the water-level detecting electrode part causes a change in electrostatic capacity and an error is observed in the detected water-level, accurate water-level of water in the container can be detected.

In the method of controlling water-level in a boiler according to the fifth aspect of the invention, the water-level in the water tube can constantly be controlled to optimum water-level in accordance with the burning capacity, vapor pressure, supply water temperature, electrical conductivity of boiler water, and the like during operation of the boiler. Thus, a good quality vapor can be obtained, and damages to the water tube can effectively be prevented.

In the method of controlling water-level in a steam separator according to the sixth aspect of the invention, the water-level in the steam separator can constantly be controlled to optimum water-level, that is, to proportional target water-level specified in accordance with the supply water temperature, burning capacity, vapor pressure, and the like during operation of the boiler. Thus, a good quality vapor with high dryness can stably be obtained, and damages to the water tube can effectively be prevented for achieving a safe operation of the boiler.

DESCRIPTION OF THE PREFERRED EMBODIMENTS

Hereinafter, description will be given of preferred embodiments of an electrode rod for detecting water-level and for carrying out a method of detecting water-level, a method of controlling water-level in a boiler, and a method of controlling water-level in a steam separator of the present invention.

First, description will be given of an embodiment of the electrode rod for detecting water-level in a boiler according to the present invention.

Figure 1:
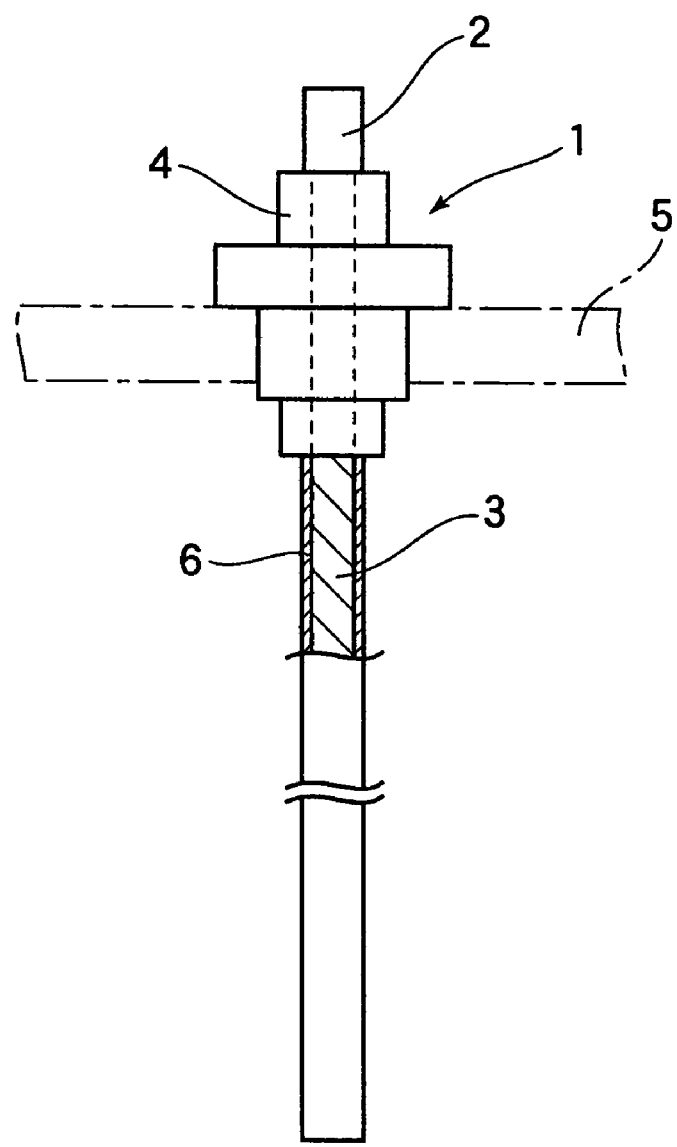
FIG. 1 is a partial sectional front view showing an example of an embodiment of an electrode rod for detecting water-level in a boiler according to the present invention.

FIG. 1 is a partial sectional front view showing an example of the embodiment of an electrode rod for detecting water-level according to the present invention.

An electrode rod for detecting water-level 1 of this embodiment is provided with an external power supply connecting terminal part 2 on one end thereof and a water-level detecting electrode part 3 on another end thereof, and is held by a cylindrical insulator 4. The electrode rod for detecting water-level 1 is attached to a metal container 5 through the insulator 4 such that the external power supply connecting terminal part 2 projects outside the container 5 and the water-level detecting electrode part 3 projects inside the container 5.

The water-level detecting electrode part 3 is formed of stainless steel, and an insulating coating 6 formed of engineering plastic with high heat resistance, high-pressure resistance, and chemical resistance is formed on a surface of the water-level detecting electrode part 3. A ketone-based synthetic resin material such as polyether ether ketone, polyether ketone, polyether ketone ketone, or polyallyl ether ketone is used as the engineering plastic. In particular, polyether ether ketone with high heat resistance is preferred.

As described above, a length of the water-level detecting electrode part 3 having the insulating coating 6 formed of engineering plastic with high heat resistance, high-pressure resistance, and chemical resistance on its surface is set to a length allowing detection of at least minimal water-level.

In the electrode rod for detecting water-level 1 having a structure as described above, the insulating coating 6 formed of engineering plastic with high heat resistance, high-pressure resistance, and chemical resistance is formed on the surface of the water-level detecting electrode part 3 projecting inside the container 5 holding water. One side of a power supply is connected to the external power supply connecting terminal part 2, and another side of the power supply is connected to the container 5 for energization. Then, a contact part of the water-level detecting electrode part 3 to be brought into contact with water in the container serves as a condenser. An electrostatic capacity between the water-level detecting electrode part 3 and the container 5 is measured by using the insulating coating 6 formed on the surface of the water-level detecting electrode part 3 as a dielectric. The water-level in the water to be brought into contact with the electrode rod for detecting water-level 1 in the container 5 can be detected from the electrostatic capacity. Thus, analog detection of change in water-level is realized by change in measured electrostatic capacity. In this embodiment, an alternating current power supply is used as the power supply.

The insulating coating 6 on the surface of the water-level detecting electrode part 3 is formed of engineering plastic with high heat resistance, high-pressure resistance, and chemical resistance as described above, and thus is capable of withstanding high-temperature, high-pressure, and chemicals in the container 5, and may assuredly carry out functions as a condenser.

Next, description will be given of an embodiment of the method of detecting water-level according to the present invention employing the electrode rod for detecting water-level 1.

In this embodiment, the electrode rod for detecting water-level 1 having the insulating coating 6 formed of engineering plastic with high heat resistance, high-pressure resistance, and chemical resistance formed on the surface of the water-level detecting electrode part 3 is attached to the container 5 such that the external power supply connecting terminal part 2 projects outside the container 5 and the water-level detecting electrode part 3 projects inside the container 5. One side of the alternating current power supply is connected to the external power supply connecting terminal part 2 of the electrode rod for detecting water-level 1, and another side of the alternating current power supply is connected to the container 5 for energization.

The electrostatic capacity between the water-level detecting electrode part 3 and the container 5 is measured by using the insulating coating 6 formed on the surface of the water-level detecting electrode part 3 as a dielectric. The water-level in the water to be brought into contact with the water-level detecting electrode part 1 in the container 5 can be detected from the electrostatic capacity.

In this way, a contact part of the electrode rod for detecting water-level 1 to be brought into contact with water in the container 5 serves as a condenser. The electrostatic capacity between the water-level detecting electrode part 3 brought into contact with water and the container 5 is measured through energization, and the water-level in the water to be brought into contact with the water-level detecting electrode part 3 in the container 5 can be detected from the electrostatic capacity. Thus, analog detection of change in water-level is realized by change in measured electrostatic capacity, and analog detection of the water-level in the water tube of the boiler is realized by change in detected water-level.

In this embodiment, the container 5 is provided with an adjusting electrode rod for detecting water-level for detecting specific water-level within a range of the water-level detecting electrode part 3. A difference between specific water-level of water held in the container 5 detected by the adjusting electrode rod for detecting water-level and the water-level of water in the container 5 detected by measuring the electrostatic capacity between the water-level detecting electrode part 3 and the container 5 is determined. The electrostatic capacity between the water-level detecting electrode part 3 and the container 5 is measured based on the difference, and the detected water-level in the container 5 is adjusted.

In this way, even if contamination or the like mixed in water is attached to the water-level detecting electrode part 3 causes a change in electrostatic capacity and an error is observed in the detected water-level, accurate water-level of water in the container 5 can be detected.

The specific water-level to be detected by the adjusting electrode rod for detecting water-level is not particularly limited as long as it is within the range of detectable water-level of the water-level detecting electrode part 3. In the case where the specific water-level to be detected by the adjusting electrode rod for detecting water-level is high water-level in the container 5, for control of the water-level in the container 5 by detecting the water-level in the container 5 from the electrostatic capacity between the water-level detecting electrode part 3 and the container 5, for example, a failure of the water-level detecting electrode part 3 of the electrode rod for detecting water-level 1 can be predicted by observation of the difference between the water-level detected from the electrostatic capacity measured by the water-level detecting electrode part 3 and the water-level in the container 5 detected by the adjusting electrode rod for detecting water-level. In the case where a failure occurs in the water-level detecting electrode part 3 of the electrode rod for detecting water-level 1, the electrostatic capacity of the water held in the container 5 is reduced. As a result, a predetermined-electrostatic capacity cannot be obtained unless the water-level is raised, and thus the water-level in the container 5 is controlled to increase. The high water-level in the container 5 refers to water-level on a higher side a normal range of the water-level in the container 5.

In the case where the specific water-level to be detected by the adjusting electrode rod for detecting water-level is medium water-level in the container 5, for control of the water-level in the container 5 by detecting the water-level in the container 5 from the electrostatic capacity between the water-level detecting electrode part 3 and the container 5, for example, specific water-level to be detected by the adjusting electrode rod for detecting water-level is within the normal range of the water-level in the container 5, and the water-level varies within a region in which water is repeatedly present or absent. As a result, the number of adjustment required for appropriately adjusting error of the water-level in the container 5 detected by the electrode rod for detecting water-level 1 increases. Thus, detection accuracy of the water-level in the container 5 can be enhanced, and the water-level in the container 5 can be controlled more accurately. The medium water-level in the container 5 refers to water-level within the normal range of the water-level in the container 5.

In the case where the specific water-level to be detected by the adjusting electrode rod for detecting water-level is low water-level in the container 5, for control of the water-level in the container 5 by detecting the water-level in the container 5 from the electrostatic capacity between the water-level detecting electrode part 3 and the container 5, for example, the water-level in the container 5 is detected by the adjusting electrode rod for detecting water-level at least once, and error of the water-level in the container 5 detected by the electrode rod for detecting water-level 1 is appropriately adjusted. Thus, accurate water-level in the water in the container 5 can be detected, and the water-level in the container 5 can be controlled accurately.

Next, a description will be given of an embodiment of the method of controlling water-level in a boiler according to the present invention employing the method of detecting water-level.

Figure 2:
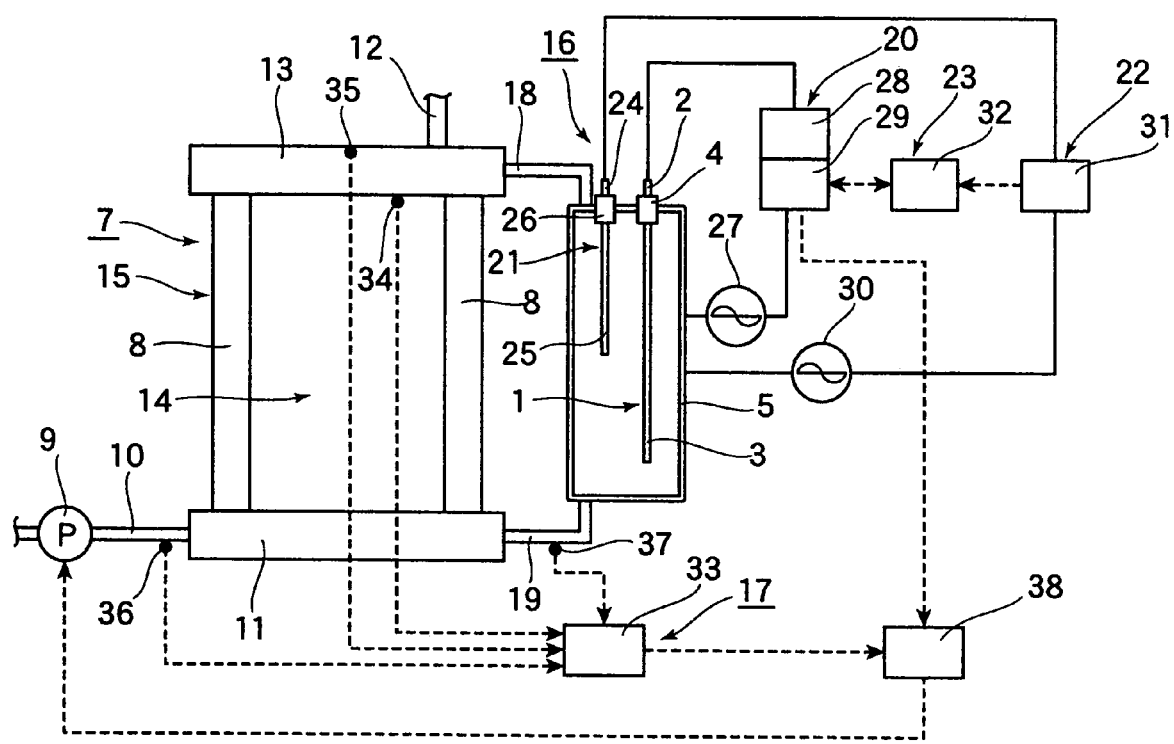
FIG. 2 is a schematic diagram showing an example of a schematic structure of a boiler system used for carrying out a method of controlling water-level in a boiler according to the present invention.

FIG. 2 is a schematic diagram showing an example of a schematic structure of a boiler system used for carrying out the method of controlling water-level in a boiler according to the present invention.

In this boiler system, a boiler 7 includes a boiler body 15 constructed of: a plurality of water tubes 8 provided circumferentially at predetermined intervals; a lower header 11 connected to a lower end of the plurality of water tubes 8, for introducing water from a water supply pump 9 through a water supply tube 10 and supplying the water to the plurality of water tubes 8; an upper header 13 connected to an upper end of the plurality of water tubes 8 for collecting a vapor generated in the plurality of water tubes 8 and delivering the vapor from a vapor tube 12 to a loading side; and a combustion chamber 14 surrounded by the plurality of water tubes 8.

Further, the boiler 7 is provided with: a water-detecting means 16 carrying out the method of detecting water-level for detecting water-level in the water tubes 8; and a water-level controlling means 17 for controlling the water-level in the water tubes 8.

The water-level detecting means 16 detects the water-level in the container 5 through energization between the water-level detecting electrode part 3 of the electrode rod for detecting water-level 1 to be attached to the container 5 connected to the lower header 11 and the upper header 13 through communicating tubes 18 and 19, and the container 5. The water-level detecting means 16 detects the water-level in the water tubes 8 at the same water-level as that of the container 5.

The water-detecting means 16 of this embodiment includes: the electrode rod for detecting water-level 1 to be attached to the container 5; a water-level detecting part 20 for measuring an electrostatic capacity between the water-level detecting electrode part 3 and the container 5 through energization between the water-level detecting electrode part 3 of the electrode rod for detecting water-level 1 having the insulating coating 6 formed on its surface as a dielectric, and the container 5, for converting the measured electrostatic capacity into water-level to detect the water-level in the container 5, and for sending the detected water-level to supply water amount controlling part of the water-level controlling means 17 described below; an adjusting electrode rod for detecting water-level 21 to be attached to the container 5 for detecting specific water-level in the container 5 within a range of detectable water-level of the water-level detecting electrode part 3; an adjusting water-level detecting part 22 for detecting that the water-level in the container 5 has reached specific water-level through energization between the adjusting electrode rod for detecting water-level 21 and the container 5; a transformation function adjusting part 23 for appropriately adjusting a transformation function of the electrostatic capacity and the water-level to be converted in the water-level detecting part 20 based on a difference between the water-level detected by the water-level detecting part 20 and the water-level detected by the adjusting water-level detecting part 22; and the like.

In this embodiment, the specific water-level in the container 5 to be detected by the adjusting water-level detecting part 22 of the adjusting electrode rod for detecting water-level 21 is medium water-level in the container 5.

The electrode rod for detecting water-level 1 attached to the container 5 is attached to the container 5 such that the external power supply connecting terminal part 2 projects outside the container 5, and the water-level detecting electrode part 3 projects inside the container 5. The length of the water-level detecting electrode part 3 is set to a length allowing detection of minimal water-level.

The adjusting water-level detecting electrode rod 21 for detecting water-level is provided with an external power supply connecting terminal part 24 on one end, and an adjusting water-level detecting electrode part 25 on another end. The adjusting water-level detecting electrode rod 21 is held by a cylindrical insulator 26, and is attached to the container 5 through the insulator 26 such that the external power supply connecting terminal part 24 projects outside the container 5 and the adjusting water-level detecting electrode part 25 projects inside the container 5.

The water-level detecting part 20 of the water-detecting means 16 has a structure in which a measuring circuit part 28 for measuring the electrostatic capacity between the water-level detecting electrode part 3 having the insulating coating 6 formed on the surface of the water-level detecting electrode part 3 as a dielectric and the container 5 through energization, and a water-level detecting circuit part 29 including a program for recording the transformation function of the electrostatic capacity and the water-level in the container 5 set in advance and converting the electrostatic capacity measured in the measuring circuit part 28 into water-level in the container 5 based on the transformation function are connected to a power supply circuit in which one side of a power supply 27 connected to the external power supply connecting terminal part 2 of the electrode rod for detecting water-level 1 and another side of the power supply 27 connected to the container 5.

The water-level detecting circuit part 29 has a structure for sending the converted water-level to the transformation function adjusting part 23 and for sending the water-level in the container 5 converted based on the transformation function adjusted in the transformation function adjusting part 23 to the supply water amount controlling part of the water-level controlling means 17 described below. In this embodiment, an alternating current power supply is used as the power supply 27.

The adjusting water-level detecting part 22 has a structure in which an adjusting water-level detecting circuit part 31 for detecting that the water in the container 5 has reached a lower end of the adjusting water-level detecting electrode part 25 by change in conduction state between the external power supply connecting terminal part 24 and the container 5 due to contact of the lower end of the adjusting water-level detecting electrode part 25 with water through energization and for sending the detected result to the transformation function adjusting part 23 is connected to a power supply circuit in which one side of a power supply 30 connected to the external power supply connecting terminal part 24 of the adjusting electrode rod for detecting water-level 21 and another side of the power supply 30 connected to the container 5. In this embodiment, an alternating current power supply is used as the power supply 30.

The transformation function adjusting part 23 is constructed of a transformation function adjusting circuit part 32. The transformation function adjusting circuit part 32 is provided with a program for determining a difference between the water-level in the container 5 detected by the adjusting water-level detecting circuit part 31 and the water-level sent from the water-level detecting circuit part 29 in the case where the fact that the water in the container 5 is brought into contact with the lower end of the adjusting water-level detecting electrode part 25 of the adjusting electrode rod for detecting water-level 21 and the water-level in the container 5 is detected is sent from the adjusting water-level detecting circuit part 31, and for appropriately adjusting the transformation function of the electrostatic capacity and the water-level in the container 5 recorded in the water-level detecting circuit part 29 based on the difference. Further, the transformation function appropriate adjusting circuit 32 sends the appropriately adjusted transformation function of the electrostatic capacity and the water-level in the container 5 to the water-level detecting circuit part 29 and appropriately adjusts the water-level detected by the water-level detecting circuit part 29.

The water-level controlling means 17 is constructed of: a proportional target water-level specifying part 33 for setting proportional target water-level in the water tubes 8 based on the burning capacity of the boiler 7, vapor pressure, temperature of supply water to be supplied to the water tubes 8, and electrical conductivity of boiler water and for specifying the proportional target water-level from the set proportional target water-level in accordance with the actual burning capacity, vapor pressure, temperature of supply water to be supplied to the water tubes 8, and electrical conductivity of boiler water; and a supply water amount controlling part 38 for constantly calculating a difference between the proportional target water-level specified in the proportional target water-supply specifying part 33 from detected values of the burning capacity, vapor pressure, supply water temperature, and electrical conductivity of boiler water during operation of the boiler detected by a burning capacity detecting part 34 for detecting the burning capacity of the boiler 7 and sending the detected value to the proportional target water-level specifying part 33, a vapor pressure detecting part 35 for detecting a pressure of a vapor to be generated in the boiler 7 and sending the detected value to the proportional target water-level specifying part 33, a supply water temperature detecting part 36 for detecting a temperature of supply water to be supplied to the water tubes 8 and sending the detected value to the proportional target water-level specifying part 33, and a boiler water electrical conductivity detecting part 37 for detecting the electrical conductivity of boiler water and sending the detected value to the proportional target water-level specifying part 33, and the water-level in the container 5 detected by the water-level detecting means 16, that is, actual water-level in the water tubes 8, and for controlling the supply water amount such that water supply is stopped when the actual water-level exceeds the specified proportional target water-level and the water is supplied until the actual water-level reaches the specified proportional target water-level when the actual water-level falls short of the specified proportional target water-level.

For detection of the burning capacity by the burning capacity detecting part 34, the burning capacity may be replaced by an amount of fuel to be supplied to a combustion device, and the fuel amount may be used for detection of the burning capacity.

The proportional target water-level in the water tubes 8 refers to optimum water-level in the water tubes 8 in accordance with the burning capacity of the boiler 1, the vapor pressure, the temperature of supply water to be supplied to the water tubes 8, and the electrical conductivity of boiler water, and refers to water-level set from a general numerical value A calculated based on the burning capacity, vapor pressure, supply water temperature, electrical conductivity of boiler water, and the like.

The general numerical value A is calculated as described below, for example.

The water-level in the boiler, and the burning capacity, vapor pressure, supply water temperature, and electrical conductivity of boiler water are in a relationship in that: an increased burning capacity lowers the water-level; an increased vapor pressure raises the water-level; an increased supply water temperature lowers the water-level; and an increased electrical conductivity of boiler water lowers the water-level.

First, a standard value indicating appropriate water-level at specific burning capacity, vapor pressure, supply water temperature, and electrical conductivity of boiler water is represented by 1.

For example, the burning capacity, vapor pressure, supply water temperature, and electrical conductivity of boiler water are represented as described below.

Burning capacity: 100% combustion = 1
Vapor pressure: 5 kg/cm$^2$ = 1
Supply water temperature: 15° C. = 1
Electrical conductivity of boiler water: 3,000 µS/cm = 1

Individual water-level standard values a, b, c, and d indicating appropriate water-level corresponding to change in value of each of the burning capacity, vapor pressure, supply water temperature, and electrical conductivity of boiler water are determined.

Burning capacity: 70% combustion = 1.1 (a)
Vapor pressure: 10 kg/cm$^2$ = 1.3 (b)
Supply water temperature: 15° C. = 1 (c)
Electrical conductivity of boiler water: 1,500 µS/cm = 1.2 (d)

The thus-determined standard values a, b, c, and d are multiplied to provide a general numerical value A.

That is, A=a×b×c×d

In the example, A=1.1×1.3×1×1.2=1.7. The general numerical value A is 1.7, and 1.7 is the optimum water-level.

The general numerical value A calculated as described above and the water-level corresponding to the general numerical value A are obtained, to thereby calculate and set the proportional target water-level.

The proportional target water-level specifying part 33 is provided with: a recording part for recording the proportional target water-level set as optimum water-level in the water tubes 8 in accordance with the burning capacity, vapor pressure, supply water temperature, and electrical conductivity of boiler water; and a program for specifying the proportional target water-level in accordance with the actual burning capacity, vapor pressure, supply water temperature, and electrical conductivity of boiler water. The proportional target water-level specifying part 33 sends the specified proportional target water-level to the supply water amount controlling part 38.

The supply water amount controlling part 38 is provided with a program for: constantly calculating a difference between the specified proportional target water-level sent from the proportional target water-level specifying part 33 and the actual water-level in the water tubes 8 sent from the water-level detecting circuit part 29; and controlling the supply water amount to the water tubes 8 by sending an order signal to the water supply pump 9 for stopping water supply to the water tubes 8 when the actual water-level exceeds the specified proportional target water-level and supplying water until the actual water-level reaches the specified proportional target water-level when the actual water-level falls short of the specified proportional target water-level.

The method of controlling water-level in a boiler according to the present invention is carried out as described below in the boiler system constructed as described above.

The water-level in the water tubes 8 of the boiler 7 is detected by the water-level detecting means 16 and sent from the water-level detecting circuit part 29 to the supply water amount controlling part 38 of the water-level controlling means 17.

Meanwhile, the burning capacity, vapor pressure, supply water temperature, and electrical conductivity of boiler water during operation of the boiler 7 are detected by the water-level controlling means 17, in the burning capacity detecting part 34, the vapor pressure detecting part 35, the supply water temperature detecting part 36, and the boiler water electrical conductivity detecting part 37, respectively. The detected values are sent to the proportional target water-level specifying part 33. The proportional target water-level specifying part 33 receiving the detected values of the burning capacity, vapor pressure, supply water temperature, and electrical conductivity of boiler water calculates the general numerical value A based on those values. Then, the proportional target water-level in accordance with the general numerical value A calculated from the set proportional target water-level is specified and sent to the supply water amount controlling part 33.

The supply water amount controlling part 38 constantly calculates a difference between the specified proportional target water-level sent from the proportional target water-level specifying part 33 and the actual water-level in the water tubes 8 sent from the water-level detecting circuit part 29, and controls the supply water amount to the water tubes 8 by sending an order signal to the water supply pump 9 for stopping water supply to the water tubes 8 when the actual water-level exceeds the specified proportional target water-level and for supplying water until the actual water-level reaches the specified proportional target water-level when the actual water-level falls short of the specified proportional target water-level.

In this way, the water-level in the water tubes 8 during operation of the boiler 7 can constantly be controlled to optimum water-level, that is, to proportional target water-level specified in accordance with the burning capacity, vapor pressure, supply water temperature, and electrical conductivity of boiler water during operation of the boiler 7. Thus, a good quality vapor with high dryness can stably be obtained, and damages to the water tubes 8 can effectively be prevented for achieving a safe operation of the boiler 7.

Note that in this embodiment, the proportional target water-level in the water tubes 8 is set based on the burning capacity, vapor pressure, supply water temperature, and electrical conductivity of boiler water, but the proportional target water-level in the water tubes 8 may be set based on one or more of the burning capacity, vapor pressure, supply water temperature, and electrical conductivity of boiler water.

Next, description will be given of an embodiment of the method of controlling water-level in a steam separator according to the present invention employing the method of detecting water-level.

Figure 3:
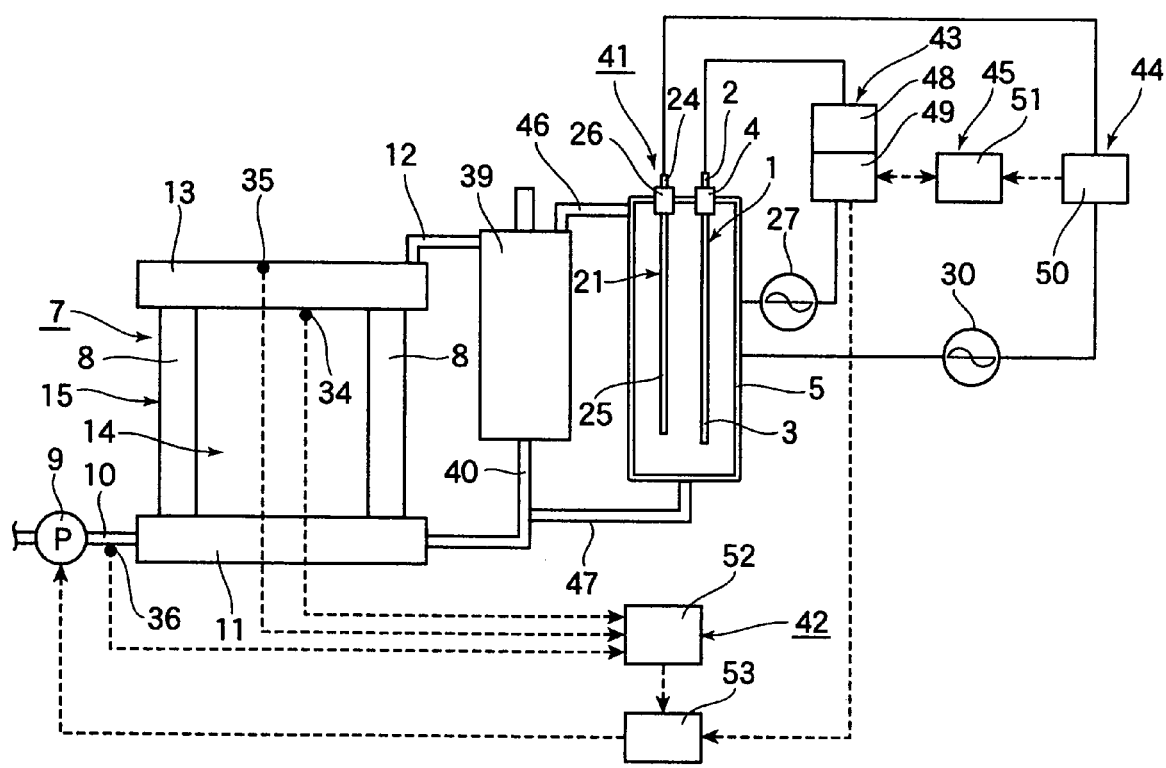
FIG. 3 is a schematic diagram showing an example of a schematic structure of a boiler system used for carrying out a method of controlling water-level in a steam separator according to the present invention.

FIG. 3 is a schematic diagram showing an example of a schematic structure of a boiler system used for carrying out the method of controlling water-level in a steam separator according to the present invention.

In this boiler system, the same parts as those of the boiler system used for carrying out the method of controlling water-level in a boiler shown in FIG. 2 are represented by the same reference numerals, and descriptions thereof are omitted.

This boiler system is provided with a steam separator 39 in the boiler 7. The boiler 7 includes a boiler body 15 constructed of: a plurality of water tubes 8 provided upright circumferentially at predetermined intervals; a lower header 11 connected to a lower end of the plurality of water tubes 8, for introducing water from the water supply pump 9 through the water supply tube 10 and supplying the water to the plurality of water tubes 8; an upper header 13 connected to an upper end of the plurality of water tubes 8, for collecting a vapor generated in the plurality of water tubes 8 and delivering the vapor from a vapor tube 12 to a loading side; and a combustion chamber 14 surrounded by the plurality of water tubes 8.

The vapor tube 12 for delivering the vapor to the loading side is connected to the upper header 13, and the steam separator 39 is connected to the vapor tube 12. The steam separator 39 and the lower header 11 are connected through a connecting tube 40 such that moisture separated from the vapor in the steam separator 39 is returned to the lower header 11 through the connecting tube 40.

The steam separator 39 is provided with: a water-level detecting means 41 for detecting water-level in the steam separator 39; and a water-level controlling 42 for controlling the water-level in the steam separator 39 by controlling an amount of supply water to be supplied to the water tubes 8.

The water-level detecting means 41 detects the water-level in the steam separator 39 through energization between the water-level detecting electrode part 3 of the electrode rod for detecting water-level 1 to be attached to the metal container 5 provided to the steam separator 39, and the container 5.

The water-level detecting means 41 of this embodiment includes: the electrode rod for detecting water-level 1 to be attached to the metal container 5 provided to the steam separator 39; a water-level detecting part 43 for measuring an electrostatic capacity between the water-level detecting electrode part 3 and the container 5 through energization between the water-level detecting electrode part 3 of the electrode rod for detecting water-level 1 having the insulating coating 6 formed on its surface as a dielectric, and the container 5, for converting the measured electrostatic capacity into water-level to detect the water-level in the container 5, and for sending the detected water-level to a supply water amount controlling part of the water-level controlling means 42 described below; the adjusting electrode rod for detecting water-level 21 to be attached to the container 5 for detecting specific water-level in the container 5 within a range of detectable water-level of the water-level detecting electrode part 3; an adjusting water-level detecting part 44 for detecting that the water-level in the container 5 has reached specific water-level through energization between the adjusting electrode rod for detecting water-level 21 and the container 5; and a transformation function adjusting part 45 for appropriately adjusting a transformation function of the electrostatic capacity and the water-level to be converted in the water-level detecting part 43 based on a difference between the water-level detected by the water-level detecting part 43 and the water-level detected by the adjusting water-level detecting part 44. In this embodiment, the specific water-level in the container 5 to be detected by the adjusting water-level detecting part 22 of the adjusting electrode rod for detecting water-level 21 is low water-level in the container 5.

The container 5 provided to the steam separator 39 is communicated with the steam separator 39 through an upper communicating tube 46 and is communicated with the connecting tube 40 through a lower communicating tube 47. The electrode rod for detecting water-level 1 attached to the container 5 is for detecting the water-level in the container 5 and is provided with the external power supply connecting terminal part 2 on one end thereof and the water-level detecting electrode part 3 on the other end thereof. The electrode rod for detecting water-level 1 is held by the cylindrical insulator 4 and is attached to the container 5 through the insulator 4 such that the external power supply connecting terminal part 2 projects outside the container 5 and the water-level detecting electrode part 3 projects inside the container 5.

The water-level detecting electrode part 3 of the electrode rod for detecting water-level 1 is formed of stainless steel, and the insulating coating 6 formed on the surface of the water-level detecting electrode part 3 and serving as a dielectric is formed of engineering plastic with high heat resistance, high-pressure resistance, and chemical resistance.

A ketone-based synthetic resin material such as polyether ether ketone, polyether ketone, polyether ketone ketone, or polyallyl ether ketone is used as the engineering plastic. In particular, polyether ether ketone with high heat resistance is preferred.

As described above, the length of the water-level detecting electrode part 3 having, on its surface, the insulating coating 6 formed of engineering plastic with high heat resistance, high-pressure resistance, and chemical resistance on its surface is set to a length allowing measurement of at least set proportional target water-level recorded in a proportional target water-level specifying part described below.

The adjusting water-level detecting electrode rod 21 is provided with the external power supply connecting terminal part 24 on one end thereof, and the adjusting water-level detecting electrode part 25 on the other end thereof. The adjusting water-level detecting electrode rod 21 is held by the cylindrical insulator 26, and is attached to the container 5 through the insulator 26 such that the external power supply connecting terminal part 24 projects outside the container 5 and the adjusting water-level detecting electrode part 25 projects inside the container 5.

The water-level detecting part 43 has a structure in which a measuring circuit part 48 for measuring the electrostatic capacity between the water-level detecting electrode part 3 and the container 5 by causing the insulating coating 6 formed on the surface of the water-level detecting electrode part 3 to be a dielectric through energization, and a water-level detecting circuit part 49 including a program for recording the transformation function of the electrostatic capacity and the water-level in the container 5 set in advance and converting the electrostatic capacity measured in the measuring circuit part 48 into water-level in the container based on the transformation function are connected to a power supply circuit including one side of the power supply 27 connected to the external power supply connecting terminal part 2 of the electrode rod for detecting water-level 1 and another side of the power supply 27 connected to the container 5.

The water-level detecting circuit part 49 has a structure for sending the converted water-level to the transformation function adjusting part 45 and for sending the water-level in the container 5 converted based on the transformation function which is adjusted in the transformation function adjusting part 45 to the supply water amount controlling part of the water-level controlling means 42 described below. In this embodiment, an alternating current power supply is used as the power supply 27.

The adjusting water-level detecting part 44 has a structure in which an adjusting water-level detecting circuit part 50, for detecting that the water in the container 5 has reached a lower end of the adjusting water-level detecting electrode part 25 by change in energization state between the external power supply connecting terminal part 24 and the container 5 due to contact of the lower end of the adjusting water-level detecting electrode part 25 with water through energization and for sending the detected result to the transformation function adjusting part 45, is connected to a power supply circuit including one side of the power supply 30 connected to the external power supply connecting terminal part 24 of the adjusting electrode rod for detecting water-level 21 and the other side of the power supply 30 connected to the container 5. In this embodiment, an alternating current power supply is used as the power supply 30.

The transformation function adjusting part 45 is constructed of a transformation function adjusting circuit part 51 provided with a program for determining a difference between the water-level in the container 5 detected by the adjusting water-level detecting circuit part 50 and the water-level sent from the water-level detecting circuit part 49 in the case where the fact that the water in the container 5 is brought into contact with the lower end of the adjusting water-level detecting electrode part 25 of the adjusting electrode rod for detecting water-level 21 and the water-level in the container 5 is detected is sent from the adjusting water-level detecting circuit part 50, and for appropriately adjusting the transformation function of the electrostatic capacity and the water-level in the container 5 recorded in the water-level detecting circuit part 49 based on the difference. Further, the transformation function adjusting circuit part 51 sends the appropriately adjusted transformation function of the electrostatic capacity and the water-level in the container 5 to the water-level detecting circuit part 49 and appropriately adjusts the water-level detected by the water-level detecting circuit part 49.

The water-level controlling means 42 is constructed of: a proportional target water-level specifying part 52 for setting proportional target water-level in the steam separator 39 based on the temperature of supply water to be supplied to the water tubes 8, burning capacity, and vapor pressure, and for specifying the proportional target water-level from the set proportional target water-level in accordance with the actual supply water temperature, burning capacity, and vapor pressure; the supply water temperature detecting part 36 for detecting the supply water temperature and sending the detected value to the proportional target water-level specifying part 52; the burning capacity detecting part 34 for detecting the burning capacity of the boiler 7 and sending the detected value to the proportional target water-level specifying part 52; the vapor pressure detecting part 35 for detecting a pressure of a vapor to be generated in the boiler 7 and sending the detected value to the proportional target water-level specifying part 52; and a supply water amount controlling part 53 for constantly calculating a difference between the proportional target water-level specified in the proportional target water-supply specifying part 52 based on detected values of the supply water temperature, burning capacity, and vapor pressure during operation of the boiler detected by the supply water temperature detecting part 36, the burning capacity detecting part 34, and the vapor pressure detecting part 35, and the actual water-level of the steam separator 39 detected by the water-level detecting means 41, and for controlling the supply water amount such that water supply is stopped when the actual water-level exceeds the specified proportional target water-level and the water is supplied until the actual water-level reaches the specified proportional target water-level when the actual water-level falls short of the specified proportional target water-level.

For detection of the burning capacity by the burning capacity detecting part 34, the burning capacity may be replaced by an amount of fuel to be supplied to a combustion device, and the fuel amount may be used for detection of the burning capacity.

The proportional target water-level in the steam separator 39 refers to optimum water-level in the steam separator 39 in accordance with the supply water temperature of water to be supplied to the water tubes 8, burning capacity, and vapor pressure, and refers to water-level set from a numerical value calculated based on the supply water temperature, burning capacity, and vapor pressure. The optimum water-level in the steam separator 39 refers to water-level preventing water accumulated in the steam separator 39 from mixing with the vapor flowing to the loading side and allowing formation of a water film of bubbles in the upper header 13.

In the case where a vapor speed is high, water accumulated in the steam separator is mixed with the vapor and provides a vapor containing moisture with low dryness. Further, in the case where the vapor speed is low, a water film of bubbles may not be formed in the upper header 13, and this case may cause a situation in that the upper part of the water tubes and the upper header 13 may be damaged by flame. Thus, in the case where the vapor speed is high, the water-level in the steam separator 39 is lowered, and in the case where the vapor speed is low, the water-level in the steam separator is raised.

In this embodiment, the proportional target water-level in the steam separator 39 was set based on the supply water temperature, burning capacity, and vapor pressure because the vapor speed is determined by the supply water temperature, burning capacity, and vapor pressure. That is, the supply water temperature, burning capacity, and vapor pressure, and the vapor speed are in a relationship in which: an increased supply water temperature increases the vapor speed; an increased burning capacity increases the vapor speed; and an increased vapor pressure increases the vapor speed.

The proportional target water-level specifying part 52 is provided with: a recording part for recording proportional target water-level set as optimum water-level in the steam separator 39 in accordance with the supply water temperature, burning capacity, and vapor pressure; and a program for specifying the proportional target water-level in accordance with the actual supply water temperature, burning capacity, and vapor pressure. The proportional target water-level specifying part 52 sends the specified proportional target water-level to the supply water amount controlling part 53.

The supply water amount controlling part 53 is provided with a program for: constantly calculating a difference between the specified proportional target water-level sent from the proportional target water-level specifying part 52 and the actual water-level in the steam separator 39 detected by the water-level detecting circuit part 41; and controlling the supply water amount to the water tubes 8 by sending an order signal to the water supply pump 9 for stopping water supply to the water tubes 8 when the actual water-level exceeds the specified proportional target water-level and supplying water until the actual water-level reaches the specified proportional target water-level when the actual water-level falls short of the specified proportional target water-level.

The method of controlling water-level in a steam separator according to the present invention is carried out as described below in the boiler system constructed as described above.

The water-level in the steam separator 39, that is, in the container 5 is detected by the water-level detecting means 41 and sent from the water-level detecting circuit part 49 to the supply water amount controlling part 53.

Meanwhile, the supply water temperature, burning capacity, and vapor pressure during operation of the boiler 7 are detected by the water-level detecting means 42, in the supply water temperature detecting part 36, the burning capacity detecting part 34, and the vapor pressure detecting part 35, respectively. The detected values are sent to the proportional target water-level specifying part 52. The proportional target water-level specifying part 52 receiving the detected values of the supply water temperature, burning capacity, and vapor pressure specifies the proportional target water-level from the proportional target water-level set and recorded as the optimum water-level in the steam separator 39 in accordance with the supply water temperature, burning capacity, and vapor pressure based on the detected values of the supply water temperature, burning capacity, and vapor pressure which are sent thereto. The specified proportional target water-level is sent to the supply water amount controlling part 53.

The supply water amount controlling part 53 constantly calculates a difference between the specified proportional target water-level sent from the proportional target water-level specifying part 52 and the actual water-level in the steam separator 39 sent from the water-level detecting circuit part 49, and controls the supply water amount to the water tubes 8 by sending an order signal to the water supply pump 9 for stopping water supply to the water tubes 8 when the actual water-level exceeds the specified proportional target water-level and supplying water until the actual water-level reaches the specified proportional target water-level when the actual water-level falls short of the specified proportional target water-level.

In this way, the water-level in the steam separator 39 can constantly be controlled to optimum water-level, that is, to proportional target water-level specified in accordance with the supply water temperature, burning capacity, and vapor pressure during operation of the boiler 7. Thus, a good quality vapor with high dryness can stably be obtained, and damages to the water tubes 8 can effectively be prevented for achieving a safe operation of the boiler 7.

Note that in this embodiment, the proportional target water-level in the steam separator 39 is set based on the supply water temperature, burning capacity, and vapor pressure, but the proportional target water-level in the water tubes 8 may be set based on one or more of the supply water temperature, burning capacity, and vapor pressure.

What is claimed is:

1. A method of detecting water-level in a metal container employing an electrode rod for detecting the water-level, the method comprising:
    connecting one side of a power supply to an external power supply connecting terminal part of the electrode rod and connecting another side of the power supply to the metal container for energization;
    measuring an electrostatic capacity between a water-level detecting electrode part of the electrode rod and the metal container by using as a dielectric an insulating coating formed on a surface of the water-level detecting electrode part;
    detecting water-level of water to be brought into contact with the water-level detecting electrode part in the metal container from the electrostatic capacity;
    providing to the container an adjusting electrode rod for detecting water-level for detecting specific water-level within a range of the water-level detecting electrode part;
    determining a difference between the specific water-level detected by the adjusting electrode rod for detecting water-level and water-level detected by measuring the electrostatic capacity; and
    adjusting the water-level to be detected by measuring the electrostatic capacity based on the difference.

2. A method of controlling water-level in a boiler employing the method of detecting water-level according to claim 1, comprising:
    setting proportional target water-level in a boiler from at least one of burning capacity, vapor pressure, supply water temperature, and electrical conductivity of boiler water;
    detecting at least one of the burning capacity, vapor pressure, supply water temperature, and electrical conductivity of boiler water during operation of the boiler;
    calculating constantly a difference between the proportional target water-level specified by detected values, and actual water-level in the boiler detected by the method of detecting water-level; and
    controlling a supply water amount by stopping water supply when the actual water-level exceeds the specified proportional target water-level, and by supplying water until the actual water-level reaches the proportional target water-level when the actual water-level falls short of the specified proportional target water-level.

3. A method of controlling water-level in a steam separator employing the method of detecting water-level according to claim 1, comprising:
    setting proportional target water-level in a steam separator from at least one of supply water temperature, burning capacity, and vapor pressure;
    detecting at least one of the supply water temperature, burning capacity, and vapor pressure during operation of the boiler;
    specifying the proportional target water-level by detected values;
    detecting actual water-level in the steam separator by the method of detecting water-level;
    calculating constantly a difference between the specified proportional target water-level, and the actual water-level; and
    controlling a supply water amount by stopping water supply to the boiler when the actual water-level exceeds the specified proportional target water-level, and by supplying water until the actual water-level reaches the proportional target water-level when the actual water-level falls short of the specified proportional target water-level.

4. The method of detecting water-level employing the electrode rod as recited in claim 1, wherein analog detection of change in water-level is realized by change in measured electrostatic capacity.

5. The method of detecting water-level as recited in claim 1, wherein the specific water-level is a medium water level in the container.

6. The method of detecting water-level as recited in claim 1, further comprising detecting a failure of the water-level detecting electrode part using an observation of said difference.

7. The method of detecting water-level as recited in claim 6, wherein the specific water-level is a high water-level for use in said step of detecting a failure.

8. An electrode rod for detecting water-level, attached to penetrate a metal container through an insulator, for detecting water-level in the container including an external power supply connecting terminal part projecting outside the container, and a water-level detecting electrode part projecting inside the container, and an adjusting part for adjusting a value of an electrostatic capacity between the water-level detecting electrode part and the metal container, the adjusting part using a difference between a water-level detected by the electrode rod and a specific water-level, the electrode rod comprising an insulating coating formed of engineering plastic with high heat resistance, high-pressure resistance, and chemical resistance and formed on a surface of the water-level detecting electrode part.

9. The electrode rod for detecting water-level as recited in claim 8, wherein the engineering plastic comprises a ketone-based synthetic resin material.

10. The electrode rod for detecting water-level as recited in claim 8, wherein the engineering plastic comprises polyether ether ketone, polyether ketone, polyether ketone ketone, or polyallyl ether ketone.

11. The electrode rod for detecting water-level as recited in claim 8, wherein the external power supply connecting terminal is connected to an alternating current power supply.

12. The electrode rod for detecting water-level as recited in claim 8, wherein the insulating coating carries out a function of a condenser.

* * * * *

UNITED STATES PATENT AND TRADEMARK OFFICE
CERTIFICATE OF CORRECTION

| | | |
|---|---|---|
| PATENT NO. | : 7,628,067 B2 | Page 1 of 1 |
| APPLICATION NO. | : 11/706980 | |
| DATED | : December 8, 2009 | |
| INVENTOR(S) | : Yuji Yoshinari et al. | |

It is certified that error appears in the above-identified patent and that said Letters Patent is hereby corrected as shown below:

Title Page:

Item (73) – Assignee, should read as follows:

-- Miura Co., Ltd., Ehime-ken (JP) --.

Signed and Sealed this

Second Day of November, 2010

David J. Kappos
*Director of the United States Patent and Trademark Office*